United States Patent [19]

Miyake et al.

[11] 4,384,884
[45] May 24, 1983

[54] PROCESS FOR THE PRODUCTION OF A HARD SOLID SOLUTION CONTAINING MOLYBDENUM

[75] Inventors: Masaya Miyake; Minol Nakano; Mitsuo Kodama; Akio Hara, all of Itami, Japan

[73] Assignee: Sumitomo Electric Industries, Ltd., Japan

[21] Appl. No.: 222,902

[22] Filed: Jan. 5, 1981

[51] Int. Cl.³ .............................................. C22C 1/04
[52] U.S. Cl. ......................... 75/0.5 AB; 75/0.5 BB; 75/0.5 AC; 75/0.5 BC; 75/121; 75/251; 423/440
[58] Field of Search ....... 75/0.5 AB, 0.5 AC, 0.5 BB, 75/0.5 BC, 121, 251; 423/440

[56] References Cited

U.S. PATENT DOCUMENTS

| | | | |
|---|---|---|---|
| 3,418,103 | 12/1968 | Lasdon | 75/0.5 AB |
| 3,743,499 | 7/1973 | Ramqvist | 75/0.5 BC |
| 4,139,374 | 2/1979 | Yih et al. | 423/440 |
| 4,216,009 | 8/1980 | Miyake et al. | 75/0.5 AB |
| 4,257,809 | 3/1981 | Burden | 423/440 |

Primary Examiner—John P. Sheehan
Attorney, Agent, or Firm—Wenderoth, Lind & Ponack

[57] ABSTRACT

The present invention relates to a process for the production of a solid solution constructed of at least one hard phase having a crystal structure of simple hexagonal type and selected from mixed carbides or carbonitrides of molybdenum and tungsten, which process comprises preparing an alloy powder consisting of a solid solution of molybdenum and tungsten, adding to the alloy powder carbon in an amount necessary for forming $(Mo, W)_2C$ and/or $(Mo, W)_2(CN)$, heating the mixture at a temperature at which $(Mo, W)_2C$ and/or $(Mo, W)_2(CN)$ is stable, adding to the $(Mo, W)_2C$ and/or $(Mo, W)_2(CN)$ carbon in an amount necessary for forming $(Mo, W)C$ and/or $(Mo, W)(CN)$ optionally with an iron group metal and then heating the mixture at a temperature at which $(Mo, W)C$ and/or $(Mo, W)(CN)$ is stable.

5 Claims, 5 Drawing Figures

PROCESS FOR THE PRODUCTION OF A HARD SOLID SOLUTION CONTAINING MOLYBDENUM

BACKGROUND OF THE INVENTION

1. Field of the Invention

The present invention relates to a process for the production of a solid solution carbide of (Mo, W)C or a carbonitride of (Mo, W)(CN), which are used as a raw material for cemented carbide alloys, and more particularly, it is concerned with a process for the production of such a carbide or carbonitride with a uniform particle size.

2. Description of the Prior Art

Up to the present time, as a starting material for cemented carbides, there has been used tungsten carbide (WC) as a major component, but tungsten is found in only a few parts of the world and thus is very expensive. Lately, the tendency is to replace WC molybdenum carbide (MoC) having the same crystal structure as WC as well as mechanical properties similar to WC and since MoC is unstable, MoC is stabilized by dissolving WC therein to form a solid solution of (Mo, W)C which is is used as a starting material for cemented carbide alloys.

When using such a carbide or carbonitride as a raw material for cemented carbides alloys or hard alloys, it is most important how to control the particle size of the hard phase in the alloys and the thickness of the binder phase corresponding thereto and to this end, the particle size and eveness of the raw material powder such as (Mo, W)C or (Mo, W)(CN) powder are most important for making even the particle size and distribution there of the hard phase.

In the production of mixed carbides of Group IVa, Va and VIa metals of Periodic Table, metal oxides, carbides and carbon are mixed correspondingly to the composition of an object compound and reacted at a high temperature, or the reaction is promoted by adding an additive to increase the diffusion rate. When a solid solution is produced by the solid phase reaction of powders, however, the degree of reaction is scattered depending on the mode of mixing the powders, the particle size and size distribution of the powders used. In order to form a uniform solid solution, a heating operation for a long period of time is necessary as in the process described in Japanese Patent Application (OPI) No. 146306/1976 in which a part of Mo in MoC is replaced by W to stabilize the (Mo, W)C phase of simple hexagonal type. That is, in the production of a uniform solid solution by the diffusion among powders of metals such as Mo and W and carbides, heating at a high temperature such as 1600° C. or higher for a long time is required, in particular, for diffusing and dissolving metallic powders of Mo and W with a particle size of several microns.

As a result of examining the particle size and the particle size distribution of (Mo, W)C and (Mo, W)(CN) prepared by such a known method, a reaction mechanism is found as shown in FIG. 1. In the method as shown in Japanese Patent Application (OPI) No. 146306/1976 and Japanese Patent Application (OPI) No. 104617/1978 wherein predetermined amounts of MoC and WC to give a final carbide (Mo, W)C are previously mixed, large amounts of carbon and an iron group metal such as Co or Ni for stabilizing (Mo, w)C are added before the reaction (a-1). During the course of the reaction, there appears once a stable form of (Mo, W)$_2$C+C(a-2), but when this is converted into (Mo, W)C by a subsequent heat treatment, the particle size or diameter fluctuates (a-3).

If the powder particles are very fine, on the other hand, diffusion proceeds well and a large amount of an iron group metal as a diffusion aid is not required, resulting in a good quality carbide. However, it is difficult on a commercial scale to obtain powders of metals and carbides with a particle size of 0.5 micron or less.

We, the inventors, have hitherto found that when Mo and W are mixed in the form of ammonium salts of Mo and W, in the state of their solutions or in the form of their oxides or halides, mixing can better be accomplished and a uniform solid solution can more readily be obtained at a relatively low temperature as compared with combinations of metal powders and/or carbide powders. In this case, for example, W and Mo are uniformly mixed at the stage of forming their oxides and reduced with hydrogen to form a solid solution of (Mo, W) which is then reacted with carbon to give a solid solution carbide. This has already been proposed as a commercially feasible process (U.S. Pat. No. 4,216,009).

SUMMARY OF THE INVENTION

It is an object of the present invention to provide a process for the production of a hard solid solution containing molybdenum.

It is another object of the present invention to provide a process for the production of a solid solution carbide of (Mo, W)C or a solid solution carbonitride of (Mo, W)(CN) having an even particle size.

It is a further object of the present invention to provide a process of producing a solid solution of (Mo, W)C or (Mo, W)(CN) by two carburization stages.

These objects can be attained by a process for the production of a hard solid solution constructed of at least one hard phase having a crystalline structure of simple hexagonal type, which process comprises preparing an alloy powder consisting of a solid solution of molybdenum and tungsten, adding to the alloy powder carbon in an amount sufficient to form (Mo, W)$_2$C and/or (Mo, W)$_2$(CN), heating the mixture at a temperature at which (Mo, W)$_2$C and/or (Mo, W)$_2$(CN) is stable, adding to the (Mo, W)$_2$C and/or (Mo, W)$_2$(CN) carbon in an amount sufficient to form (Mo, W)C and/or (Mo, W)(CN) optionally with an iron group metal and then heating the mixture at a temperature at which (Mo, W)C and/or (Mo, W)(CN) is stable.

BRIEF DESCRIPTION OF THE DRAWING

The accompanying drawings illustrate the principle and merits of the present invention in more detail.

DETAILED DESCRIPTION OF THE INVENTION

The present invention aims at making uniform the particle size of a solid solution powder of (Mo, W)C and (Mo, W)(CN) to be obtained finally. That is to say, the present invention provides a process for the production of a solid solution constructed of at least one hard phase having a crystal structure of simple hexagonal type and selected from mixed carbides or carbonitrides of molybdenum and tungsten and solid solutions of tungsten and molybdenum, which process comprises preparing an alloy powder consisting of a solid solution of molybdenum and tungsten, adding to the alloy powder carbon in an amount necessary for forming $(Mo, W)_2C$ and/or $(Mo, W)_2(CN)$, heating the mixture at a temperature at which $(Mo, W)_2C$ and/or $(Mo, W)_2(CN)$ is stable, adding to the $(Mo, W)_2C$ and/or $(Mo, W)_2(CN)$ carbon in an amount necessary for forming (Mo, W)C and/or (Mo, W)(CN) optionally with an iron group metal and then heating the mixture at a temperature at which (Mo, W)C and/or (Mo, W)(CN) is stable.

Figure 1:
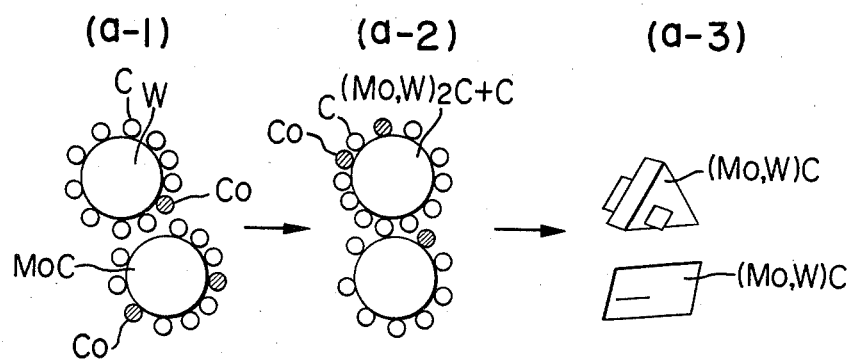
FIG. 1 and FIG. 2 show reaction models to illustrate a process of formation of a solid solution (Mo, W)C, the model of FIG. 1 being according to the prior art method and that of FIG. 2 being according to the present invention.
Figure 2:
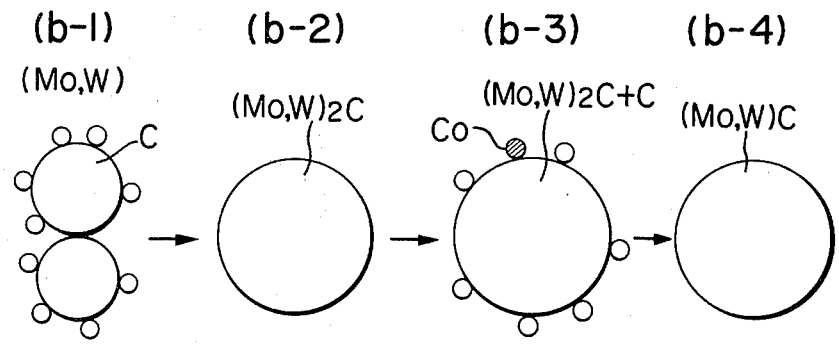

In the process of the present invention, an alloy powder containing molybdenum and tungsten is prepared by a mixed powder obtained (1) by mixing an ammonium salt of tungsten (e.g., ammonium tungstate) and an ammonium salt of molybdenum (e.g., ammonium molybdate) in the form of a solution to coprecipitate para-salts of tungsten and molybdenum, (2) by coprecipitating $WO_3$ and $MoO_3$ with nitric acid or hydrochloric acid, or (3) by mixing previously prepared oxides or hydroxides completely in a mechanical manner. Thus, the alloy powder of (Mo, W) is previously synthesized, mixed with only carbon in a minimum quantity necessary for forming $(Mo, W)_2C$ and subjected to a primary reaction (FIG. 2, b-1). If the reaction temperature is suitably chosen during the same time as mentioned hereinafter, a uniform particle growth can be carried out because of absence of excess carbon becoming a bar to the particle growth of $(Mo, W)_2C$. The $(Mo, W)_2C$ powder (b-2) grown by this method is mixed with carbon in an amount necessary for the final carbide composition and optionally with an iron metal such as Co or Ni (b-3), and subjected to a secondary carburization at a temperature at which (Mo, W)C is stable, thus obtaining (Mo, W)C powder with a uniform particle size distribution (b-4).

In the case of producing a carbonitride of (Mo, W)(CN), a mixture of carbon mixed in an anlogous manner to the case of (Mo, W)C is subjected to carburization steps in which the carburization atmosphere is changed to that containing $N_2$ partly or throughout the steps.

For the practice of the present invention, it is desired that the quantity of carbon to be added before the primary reaction is in the range of $z = 0.4–0.6$ in carbides or carbonitrides represented respectively by $(Mo, W)C_z$ or $(Mo, W)(CN)_z$. If z is less than 0.4, the carbide is not stabilized as $(Mo, W)_2C$ while if z is more than 0.6, the carbide after the primary reaction is under such a state that $(Mo, W)_2C$, (Mo, W)C and $(Mo, W)_3C_2$ coexist and thus a uniform particle growth is not carried out. Moreover, it is desirable to control the quantity of carbon to be added before the secondary reaction so that the final carbide composition be in the range of $z = 0.9–1.0$ in $(Mo, W)C_z$ or $(Mo, W)(CN)_z$. If z is less than 0.9, the strength of the final alloy is insufficient, while if z exceeds 1.0, it is difficult to sinter the final alloy.

Where the carbide or carbonitride is represented by $(Mo_a W_b)C_z$ or $(Mo_a W_b)(CN)_z$, the primary heating condition when $a \geq 0.8$ and $b \leq 0.2$ is preferably 1400° C. or higher. If lower than 1400° C., $(Mo, W)_2C$ is not so stabilized and, accordingly, a higher temperature is rather desirable. On the contrary, the secondary reaction is preferably carried out at a temperature of 1400° C. or lower.

When $a < 0.8$ and $b > 0.2$, the primary heating condition is preferably 1400° C. or higher, more preferably 1800° C. or higher. When the secondary carburization reaction is carried out at a temperature of 1800° C. or lower, the carbide is stabilized as (Mo, W)C and at a temperature of 1400° C. or lower, it is more stabilized. In order to accomplish the reaction surely and in a short time, it is further desired that the primary carbide is once cooled to room temperature and then subjected to a treatment to impart a mechanical strain, such as grinding.

The following examples are given in order to illustrate the present invention in detail without limiting the same.

EXAMPLE 1

54 g of Mo powder and 46 g of W powder were dissolved in 28% aqueous ammonia and gradually neutralized with hydrochloric acid to precipitate needle crystals. The thus coprecipitated $WO_3$ and $MoO_3$ were well mixed. These oxides were sintered at 800° C. in the air. The mixed powder was charged in a Ni boat, covered and then reduced at 1000° C. in an $H_2$ stream to obtain an alloy powder of 2 microns.

The resulting alloy powder $(Mo_{0.7}W_{0.3})$ was mixed with 4.5% by weight of carbon powder and ball milled for 36 hours. This mixed powder was reacted within a temperature range wherein the subcarbide $(Mo_{0.7}W_{0.3})_2C$ was stable, i.e. at 1900° C. in an $H_2$ stream for 1 hour. The carbide was once cooled and ball milled for 1 hour. Measurement of the particle size of the $(Mo_{0.7}W_{0.3})_2C$ powder showed that it was a uniform powder with a particle size of 8 microns and a narrow particle size distribution.

The primary carbide powser was mixed with 4.5% by weight of carbon powder and 1% by weight of $Co_2O_3$ powder and subjected again to carburization at a temperature at which the monocarbide was stable, i.e. at 1400° C. in an $H_2$ stream. When the properties of the resulting carbide were examined, it was found that the carbide was a monocarbide of WC type containing combined carbon in a substantially theoretical quantity as showin in Table 1:

TABLE 1

| Total Carbon | Free Carbon | Combined Carbon | $\dfrac{\text{Combined Carbon}}{\text{Theoretical Carbon}} \times 100$ |
|---|---|---|---|
| 8.93% | 0.02% | 8.91% | 99.8% |

EXAMPLE 2

A solid solution carbide of $(Mo_{0.85}W_{0.15})C$ was made for trial by the procedure of Example 1. An alloy powder of $(Mo_{0.85}W_{0.15})$ was previously prepared in an analogous manner to Example 1 and well mixed with 5.0% by weight of carbon powder. The mixed powder was charged in a graphite boat, heated up to 1600° C. for a period of time of about 3 hours, held at the maximum temperature for 1 hour and cooled to room temperature for 10 hours. The quantity of carbon in the powder is shown in Table 2. The reactivity was 50.2%. The analytical result of X ray diffraction showed a peak of (Mo, W)$_2$C only.

TABLE 2

| Total Carbon | Free Carbon | Combined Carbon | Reactivity* |
|---|---|---|---|
| 4.91% | 0.07% | 4.84% | 50.2% |

Note:
*Reactivity = $\frac{\text{Combined Carbon}}{\text{Theoretical Carbon}} \times 100$ The subcarbide powder of (Mo$_{0.85}$W$_{0.15}$)$_2$C was sufficiently mixed with 4% by weight of carbon powder and 0.3% by weight of Co powder, charged in a Tammann-furnace and heated at 1250° C. for about 40 minutes in an H$_2$ stream. The properties of the resulting carbide were examined thus obtaining results as shown in Table 3:

TABLE 3

| Total Carbon | Free Carbon | Combined Carbon | Reactivity |
|---|---|---|---|
| 9.57% | 0.21% | 9.45% | 95% |

X ray diffraction showed that the peak of (Mo, W)$_2$C substantially disappeared and the carbide had substantially a crystal structure of WC type.

EXAMPLE 3

The alloy powder of (Mo$_{0.7}$W$_{0.3}$) obtained in an analogous manner to Example 1 was mixed with 4.5% by weight of carbon powder and ball milled for 36 hours. The mixed powder was reacted at 1800° C. in an N$_2$ stream for 1 hour, cooled to room temperature and ball milled further for 1 hour. The nitrogen content, as analyzed in the powder, was 0.10%. The resulting carbonitride of (Mo$_{0.7}$W$_{0.3}$)$_2$(CN) was mixed with 4.3% by weight of carbon powder and 0.3% by weight of iron powder and subjected to carburization at 1500° C. in an N$_2$ stream, thus obtaining a carbonitride with the following analytical data:

TABLE 4

| Total Carbon | Free Carbon | Combined Carbon | Nitrogen | Reactivity |
|---|---|---|---|---|
| 8.60% | 0.00% | 8.60% | 0.15% | 97.5% |

The thus resultant carbonitride had a particle size of 7 microns and, according to X ray diffraction analysis thereof, there was substantially a peak of WC type with a negligible amount of (Mo, W)$_2$C.

As apparent from these results, the carbides and carbon-nitrides obtained according to the present invention had a mean particle size of 4 to 8 microns, suitable for use as a raw material of cemented carbides alloys for hot use.

EXAMPLE 4

The alloy powder of (Mo$_{0.5}$W$_{0.5}$) obtained in an analogous manner to Example 1 was mixed with 4.0% by weight of carbon powder and ball milled for 36 hours. The mixed powder was reacted at 1700° C. in an H$_2$ stream for 1 hour, and cooled to room temperature. The resulting (Mo$_{0.5}$W$_{0.5}$)$_2$C powder was then mixed with 4.0% by weight of carbon powder and 0.3% by weight of cobalt powder, and subjected to carburization at 1450° C. in an H$_2$ stream, thus obtaining a carbide with the following analytical data:

TABLE 4

| Total Carbon | Free Carbon | Combined Carbon | Nitrogen | Reactivity |
|---|---|---|---|---|
| 7.87% | 0.01% | 7.86% | 0.02% | 99.5% |

EXAMPLE 5

The alloy powder prepared in Example 1 was mixed with 8.9% by weight of carbon powder, ball milled for 36 hours and then reacted at 1700° C. in an H$_2$ stream for 1 hour to form a (Mo$_{0.7}$W$_{0.3}$)C powder (B).

The (Mo$_{0.7}$W$_{0.3}$)C powder (A) and (Mo$_{0.7}$W$_{0.3}$)C powder (B) were respectively mixed with 30% by weight of Co in a mortar, compacted in a mold and sintered at 1300° C. in a high vacuum of 10$^{-4}$ mmHg or less for 1 hour. The alloy (C) from the powder (A) and the alloy (D) from the powder (B) were respectively subjected to examination of the particle size distribution of the carbide using an image analyser, thus obtaining results shown in Table 6:

TABLE 6

| | (% by volume) | | | | | |
|---|---|---|---|---|---|---|
| | d < 0.5μ | 0.5μ ≦ d < 1μ | 1μ ≦ d < 3μ | 3μ ≦ d < 5μ | 5μ ≦ d < 10μ | 10μ ≦ d |
| Our Alloy (C) | 0 | 0 | 0.9 | 11.1 | 77.9 | 10.1 |
| Comparison Alloy (D) | 4.5 | 6.1 | 16.7 | 20.3 | 40.2 | 12.2 |

Note:
d = particle diameter

EXAMPLE 6

The (Mo$_{0.7}$W$_{0.3}$)C powder (A) prepared in Example 1 and the (Mo$_{0.7}$W$_{0.3}$)C powder (B) prepared in Example 5 were respectively mixed with 30% by weight of Co, ball milled by wet process, compacted in a mold and sintered at 1300° C. in a high vacuum of 10$^{-4}$ mmHg or less for 1 hour to obtain alloys with the following properties:

TABLE 7

| | (Mo$_{0.7}$W$_{0.3}$)C powder used | Density (g/cc) | Hardness (HRA) | Transverse Rupture Strength (Kg/mm$^2$) |
|---|---|---|---|---|
| Our Alloy (E) | A | 10.2 | 83.5 | 290 |
| Comparison Alloy (E) | B | 10.2 | 83.0 | 250 |

EXAMPLE 7

Header tools for nuts were made of Our Alloy (E) and Comparison Alloy (E), prepared in Example 6, and used, for test, as a header die for producing a wire rod of SCr 4. The results are shown in Table 8 with those of a marketed WC-25 wt % Co alloy:

TABLE 8

Tool Life ($\times 10^{-4}$)

|  | 10 | 20 | 30 | 40 | 50 |
|---|---|---|---|---|---|
|  |  |  | (pieces) |  |  |
| Our Alloy (E) |  |  |  |  | o |
|  |  |  |  |  | o |
|  |  |  |  |  | o |
| Comparison Alloy (F) |  |  | x35 |  |  |
|  |  | x28 |  |  |  |
|  |  |  |  | x46 |  |
| WC-25% Co Alloy | x17 |  |  |  |  |
|  | x10 |  |  |  |  |
|  | x11 |  |  |  |  | o: usable
x: broken

EXAMPLE 8

The $(Mo_{0.7}W_{0.3})C$ powder (A) prepared in Example 1 and the $(Mo_{0.7}W_{0.3})C$ powder (B) prepared in Example 5 were respectively mixed with 35% by weight of Co powder and in each case, six sample alloys were prepared with varying the carbon content in the range of 5.30 to 5.90% by weight. The properties of these alloys are shown in Table 9:

TABLE 9

|  | Density (g/cc) | Hardness (HRA) | Transverse Rupture Strength (Kg/mm²) | Analytical Values | |
|---|---|---|---|---|---|
|  |  |  |  | Total Carbon (%) | Free Carbon (%) |
| Our Alloy No. | | | | | |
| 1 | 10.0 | 82.6 | 185 | 5.32 | 0.00 |
| 2 | 10.0 | 82.9 | 260 | 5.46 | 0.00 |
| 3 | 10.0 | 82.3 | 320 | 5.60 | 0.00 |
| 4 | 10.0 | 82.4 | 295 | 5.72 | 0.00 |
| 5 | 9.9 | 82.3 | 230 | 5.80 | 0.06 |
| 6 | 9.9 | 82.4 | 180 | 5.90 | 0.15 |
| Comparison Alloy No. | | | | | |
| 7 | 10.0 | 82.3 | 180 | 5.30 | 0.00 |
| 8 | 10.0 | 82.2 | 167 | 5.48 | 0.00 |
| 9 | 10.0 | 82.5 | 225 | 5.62 | 0.00 |
| 10 | 10.0 | 82.1 | 248 | 5.70 | 0.00 |
| 11 | 9.9 | 82.2 | 210 | 5.81 | 0.06 |
| 12 | 9.9 | 82.2 | 175 | 5.90 | 0.14 |

Figure 3:
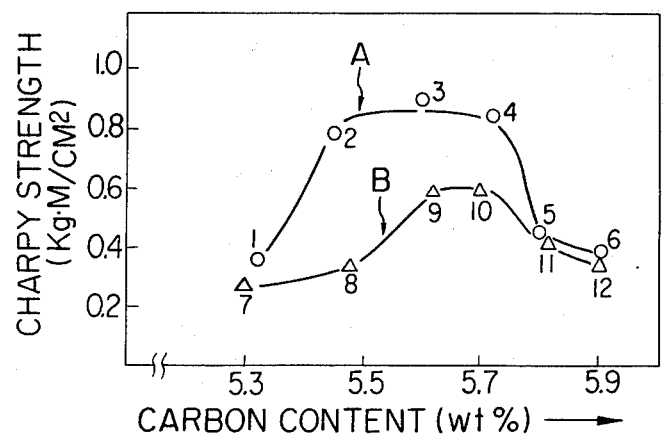
FIG. 3 is a graph showing the relationship between the carbon content and the strength as to alloys of the present invention and comparative alloys of the prior art.

The alloys prepared in Example 8 were subjected to Charpy test, thus obtaining results shown in FIG. 3 (Curve A: Alloy Nos. 1–6 of the present invention; Curve B: Alloy Nos. 7–12 of the prior art).

Figure 4:
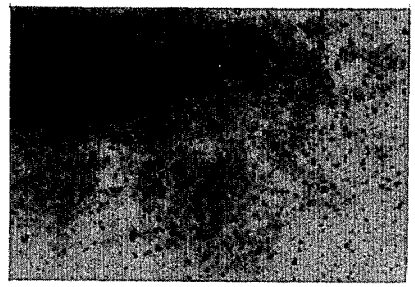
FIG. 4 and FIG. 5 are micrographs magnified 150 times showing the dispersed state of (Mo$_{0.7}$W$_{0.3}$)$_2$C as to alloys of the present invention and the prior art respectively.
Figure 5:

The alloys of Example 8 (No. 2 and No. 8) were compared as to the dispersed state of $(Mo_{0.7}W_{0.3})C$ by taking micrographs magnified 150 times, as shown in FIG. 4 and FIG. 5 respectively.

What is claimed is:

1. A process for the production of a hard solid solution comprising at least one hard phase having a crystal structure of simple hexagonal type and being represented by $(Mo_aW_b)C_z$ or $(Mo_aW_b)(CN)_z$ wherein $z = 0.9$ to 1.0 and $a + b = 1$, which process comprises:
   (a) preparing an alloy powder consisting of a solid solution of molybdenum and tungsten and adding to the alloy powder carbon in an amount sufficient to give a mixture wherein $z = 0.4$ to 0.6,
   (b) heating the mixture at a temperature of at least 1400° C., and in an atmosphere containing nitrogen in the case of forming the carbonitride,
   (c) cooling the mixture,
   (d) grinding the mixture with carbon in an amount sufficient to give $z = 0.9$ to 1.0, and
   (e) then heating the mixture at a temperature of at most 1400° C. in the case of $a \geq 0.8$ and $b \leq 0.2$ or at a temperature of at most 1800° C. in the case of a °0.8 and $b > 0.2$, and in an atmosphere containing nitrogen in the case of forming the carbonitride.

2. The process according to claim 1 wherein an iron group metal is included in said mixture ground with carbon in step (d).

3. The process as claimed in claims 1 or 2, wherein the heating is carried out in a hydrogen stream.

4. The process as claimed in claims 1 or 2, wherein the alloy powder is prepared by mixing molybdenum and tungsten in the form of compounds thereof selected from the group consisting of oxides, hydroxides, chlorides, sulfates, nitrates, metallic acids and mixtures thereof and then reducing the mixture with at least one member selected from the group consisting of hydrogen and ammonia.

5. The process as claimed in claim 4, wherein ammoniacal solutions of molybdenum and tungsten are mixed.

* * * * *